April 27, 1954     M. R. CINES ET AL     2,676,873
METHOD OF LOWERING THE pH OF FURNACE BLACKS
Filed July 15, 1949
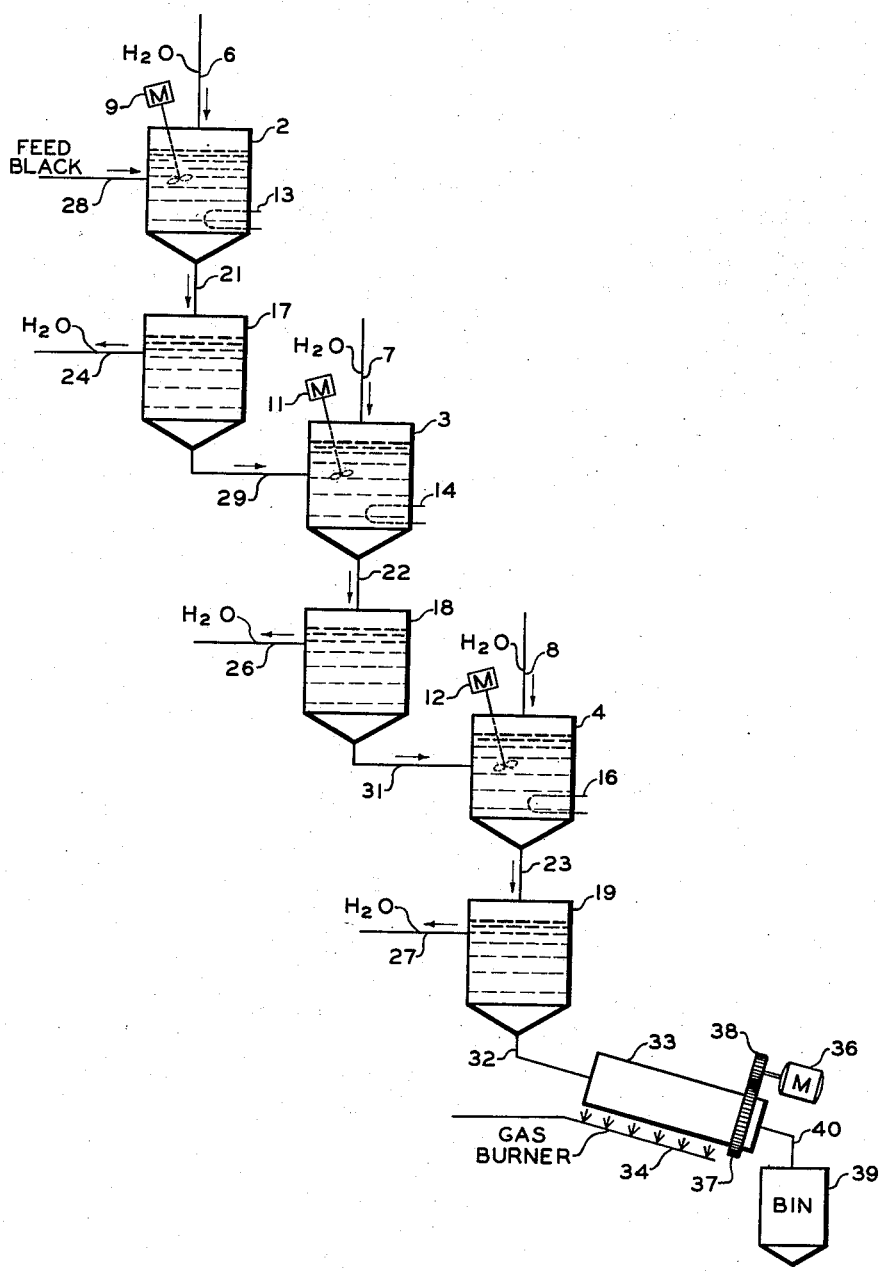
INVENTOR.
M.R. CINES
J.T. ROACH Patented Apr. 27, 1954

2,676,873

UNITED STATES PATENT OFFICE 2,676,873

METHOD OF LOWERING THE pH OF FURNACE BLACKS

Martin R. Cines and James T. Roach, Bartlesville, Okla., assignors to Phillips Petroleum Company, a corporation of Delaware Application July 15, 1949, Serial No. 105,012

13 Claims. (Cl. 23—209.9)

This invention relates to a method of treating furnace blacks. In one aspect, it relates to a method of treating high-pH furnace blacks. In another aspect, it relates to a method of increasing the scorch time and lowering the pH of high-pH furnace blacks.

The carbon blacks first used in the compounding of rubber were produced by the channel process wherein natural gas was burned in a deficiency of oxygen and the flame was caused to impinge upon a relatively cool metal surface, whereon carbon was deposited and from which it was afterwards removed and recovered. Channel blacks are characterized by long scorch times and low pH's. The major disadvantages of the channel black process are its inefficiency and low yields.

A more efficient process, generally known as the furnace black process, has recently come into extensive use. This process permits the use of gas and/or liquid hydrocarbon feeds and gives high yields. This new type of carbon black is generally designated as furnace black and is superior to channel blacks for some uses. One of the problems encountered with furnace blacks is the relatively short scorch times observed in some rubber mixes. It is important that the scorch time be sufficiently long to permit all mechanical processing of the rubber mix before vulcanization begins.

Furnace black may be defined as carbon black produced by thermal decomposition and reforming and/or partial combustion of hydrocarbons in a reducing atmosphere. In contrast, channel blacks are produced in an atmosphere containing oxygen. Furnace blacks are generally characterized by an alkaline pH while channel blacks generally have an acid pH, usually less than six. While a high pH is not objectionable in itself, in a furnace black it is generally indicative of a short scorch time.

Patent 2,565,812, issued August 28, 1951, to Lynn Harbison, column 1, lines 10 to 50 and column 2, lines 1 to 5, sets forth and discusses further the problem of scorch in the rubber industry.

We have discovered a method of treatment by which it is possible to increase the scorch time and lower the pH of high-pH furnace blacks. Our invention involves the multi-stage countercurrent water extraction of furnace blacks. By this extraction, the pH is lowered and the scorch time is substantially increased.

The principal object of our invention is to provide a method of treating furnace blacks.

Another object is to provide a method of increasing the scorch time of furnace blacks.

Another object is to provide a method of reducing the pH of high-pH furnace blacks.

Other objects and advantages of our invention will be apparent to those skilled in the art upon reading the following drawing, description and claims.

The drawing is an elevational view of a diagrammatic representation of a three-stage water extraction process.

In the drawing, extraction zones 2, 3 and 4 are provided with water inlets 6, 7 and 8, agitators 9, 11 and 12, and heater coils 13, 14 and 16. Separation tanks 17, 18 and 19 are connected to extraction tanks 2, 3 and 4, respectively, by lines 21, 22 and 23, respectively. Water outlet lines 24, 26 and 27 are provided for removing water from separation tanks 17, 18 and 19, respectively. Feed line 28 is provided for introducing fresh feed into extraction tank 2. Line 29 leaves a lower portion of separation tank 17 and enters an intermediate portion of extraction tank 3 for transferring the extracted carbon black from the first stage to the second stage and line 31 is provided for transferring the extracted black from the second stage to the third stage. The extracted black from separation tank 19 is transferred via line 32 into rotary drier 33 which is heated by means of burner 34. Motor 36, operating through gears 37 and 38, rotates drier 33. The dried black is removed from said drier to bin 39 via line 40.

We have learned that a furnace black with a high pH generally has a low scorch time, and that if the black is treated in such a way as to lower the pH, the scorch time will be correspondingly increased. We have also discovered that the multi-stage extraction of alkaline furnace blacks with water will result in a lowering of the pH toward the neutral value of 7.0. Extraction with water will apparently not reduce the pH below 7 and, as a practical matter, the pH of the extracted black will only approach 7.0 as a limit.

In our drawing, we have shown a three-stage extraction apparatus for carrying out our process. However, three stages will, in general, not produce sufficient pH lowering to effect the change in scorch time. Usually it is preferred to subject the black to 5 to 15 extractions. A larger number will not do any harm but as the pH of the black approaches 7.0, the effect of each extraction becomes less. The number of such extraction stages will be dictated by the efficacy of the contacting and the pH desired for the final product.

The amount of water to be used in each extraction is not critical as long as a sufficient amount is used to thoroughly wet the black and form a slurry from which the water can be separated. As a practical matter, the amount of water will be between 3 and 100 parts of water per part of black. We prefer to add sufficient water to form a thin slurry so that agitation will be easy and transfer from the extraction to the separation stages can be readily accomplished. Large quantities of water will not have any detrimental effect on the process but will merely mean that the vessels will have to be larger than would be necessary if smaller quantities are being used.

The temperature of the water during the extraction steps can range from room temperature to the boiling point. The efficiency of the extraction is somewhat higher for higher temperatures. Consequently, we prefer to operate at temperatures between 150 and 212° F. Higher temperatures may be used at superatmospheric pressures.

The duration of the extraction will ordinarily range between one minute and one hour. Longer periods of extraction would not have any detrimental effect but would merely be a waste of time because the maximum extraction can be accomplished in less time than one hour. This length of extraction time is based on the time after the black has become wetted and any wetting time should not be considered as extraction time.

If desired, a wetting agent may be used in the extraction water for one or more stages. The greatest advantage is realized in the initial wetting stage. After the black has been wet, mixing with water in the subsequent extractions is not difficult. An advantage to using such agents in the early stages only is that subsequent extractions result in more complete removal of the wetting agent from the black. Generally, it is preferred to use an agent that does not foam and one which does not leave undesirable deposits, such as metal salts, on the black. The agents selected from the alkylaromatic sulfonic acids, alcohol sulfates, and organic esters are good. The amount of such agent will depend on the particular agent but should preferably be about 0.5 to 1.0 per cent, based on the water and should not be over 5.0% as an upper limit.

Under certain circumstances, it is found desirable to raise the pH of an acid furnace black. This can sometimes be done by using our water extraction process. However, certain types of acid pH furnace black are not affected by water extraction. This is particularly true of those blacks whose pH's have been lowered from a value above 7.0 to a value below 7.0 by thermal treatment or by catalyzed air treatment.

Our invention will be more clearly understood by a study of the following examples. All pH determinations were made with a Beckman pH meter, Model G, using glass and calomel electrodes 2½ inches in length. The Mooney scorch test is the standard rubber scorch test.

EXAMPLE I

The following procedure was used in carrying out the water extractions: approximately 2 grams of black were placed in a 50 ml. beaker and 25 ml. of distilled water was added. This mixture was boiled for 15 minutes and cooled to room temperature in a water bath. The supernatant water was decanted and the pH of the remaining slurry was determined. To the slurry a second 25 ml. portion of distilled water was added and the same procedure was repeated until 10 determinations had been made. The effect of these water extractions is indicated in the following table:

TABLE I

*Effect of water extractions on the pH of raw pelleted furnace blacks*

| Number of Extractions | pH After Extraction | |
|---|---|---|
| | Sample I | Sample II |
| 1 | 9.8 | 9.5 |
| 2 | 9.4 | 9.25 |
| 3 | 8.9 | 9.0 |
| 4 | 8.7 | 8.9 |
| 5 | 8.4 | 8.7 |
| 6 | 8.2 | 8.6 |
| 7 | 8.1 | 8.3 |
| 8 | 7.9 | 8.2 |
| 9 | 7.7 | 8.0 |
| 10 | 7.5 | 7.9 |

EXAMPLE II

Two extractions were carried out in a modified Soxhlet extraction apparatus, using 50 grams of untreated furnace black pellets, 225 ml. of distilled water and an extraction time of 24 hours. The pH of the furnace black was reduced from an original value of 9.5 to 8.2.

EXAMPLE III

The Mooney scorch time was determined for the extracted and unextracted black from Example II. The following recipe was used in blending samples for this test:

100 parts natural rubber (No. 1 smoked sheet)
50 parts carbon black
6 parts asphalt (No. 6)
4 parts zinc oxide
3 parts stearic acid
2½ parts sulfur
1½ parts PBNA
½ part Santocure The data from this evaluation are presented in the following tabulation.

| Black | pH | Mooney Scorch Time in Minutes (at 250° F.) |
|---|---|---|
| Pellets | 9.5 | 15 |
| H₂O Extracted Pellets | 7.5 | 19 |

Water extraction of furnace black pellets increased the Mooney scorch time by about 27 per cent.

Our process may be used on both loose and pelleted black.

A gas-heated rotary drier is shown for drying the black after the final extraction. Other equivalent means may be used.

The drawing which we have shown is merely a diagrammatic representation of an apparatus for carrying out our invention. Our invention is not limited to any specific apparatus for accomplishing these extractions. While the described stepwise operation is preferred, an apparatus, similar to a Soxhlet extractor may be used. In such an apparatus, the black is placed in a porous container and a stream of water is passed through the black until the desired extraction has been accomplished.

Having described our invention, we claim:

1. The method of treating an alkaline furnace black which comprises subjecting said black to successive extractions with fresh water at 70 to 212° F. to reduce the pH, and recovering a black of substantially lower pH.

2. The method of treating an alkaline furnace black to increase the scorch time of a rubber mix containing the same which comprises subjecting said black to successive extractions with fresh water at a temperature between 100° F. and 212° F. to reduce the pH of said black, and recovering a black of substantially lower pH.

3. A process for treating high pH furnace black which comprises subjecting said black to successive extractions with fresh water which comprises the steps of admixing with said black sufficient water at a temperature of 70 to 212° F. to form a slurry, agitating said slurry to insure good contact between the water and black, and recovering from the water a black of substantially reduced pH.

4. A process for treating an alkaline furnace black which comprises subjecting said black to successive extractions with fresh water which comprises the steps of thoroughly admixing said black with from 3 to 100 parts of water at a temperature of 70 to 212° F., and removing the water, the number of water extraction steps being sufficient to reduce the pH of the black to a predetermined value below the original pH, and recovering a black of substantially lower pH.

5. The method of treating an alkaline furnace black to increase the scorch time of a rubber mix containing the same which comprises successively extracting the black from 5 to 15 times with fresh water at 100 to 212° F., the amount of water used in each extraction being sufficient to form a fluid slurry with the black, drying and recovering an extracted black of substantially reduced pH.

6. The method of treating an alkaline furnace black to increase the scorch time of a rubber mix containing the same which comprises successively extracting the black from 5 to 15 times with from 3 to 100 volumes of fresh water per volume of black at 100 to 212° F. and recovering a black of substantially lower pH.

7. The method of treating an alkaline furnace black to increase the scorch time of a rubber mix containing the same which comprises successively extracting the black from 5 to 15 times at 100 to 212° F. with from 3 to 100 volumes of fresh water per volume of black, said water containing an effective amount of a wetting agent, and recovering a black of substantially lower pH.

8. The method of treating an alkaline furnace black which comprises extracting the black with a sufficient amount of fresh water in successive extractions containing an effective amount of a wetting agent to lower the pH of said black, and recovering a black of substantially lower pH.

9. The method of treating an alkaline furnace black which comprises subjecting said black to successive extractions with fresh water, at least the first of which extractions is carried out with water containing from 0.5 to 1.0 per cent of a wetting agent, the number of extractions being sufficient to reduce the pH of the original black, and recovering a black of substantially lower pH.

10. The method of claim 9 wherein the wetting agent is an alkyl aromatic sulfonic acid.

11. The method of claim 9 wherein the wetting agent is a sulfated alcohol.

12. The method of claim 9 wherein the wetting agent is an organic ester.

13. The method of treating an alkaline furnace black which has been manufactured in a furnace black producing operation and which has been completely recovered from said operation as a final product which comprises subjecting said black to successive extractions with fresh water in the liquid phase at a temperature up to 212° F. to reduce the pH of said black and recovering a black of substantially lower pH.

References Cited in the file of this patent

UNITED STATES PATENTS

| Number | Name | Date |
|---|---|---|
| 1,207,694 | Pike | Dec. 5, 1916 |

FOREIGN PATENTS

| Number | Country | Date |
|---|---|---|
| 429,088 | Great Britain | May 23, 1935 |

OTHER REFERENCES

Drogin et al.: Today's Furnace Blacks. Published by United Carbon Co., Charleston, W. Va., 1948, page 38.

Sweitzer et al.: The Rubber Age, vol. 55, No. 5, August 1944, pages 469-478.

Braendle et al.: India Rubber World, vol. 119, New York, October 1948, pages 57-62.